United States Patent [19] [11] Patent Number: 4,928,047
Arai et al. [45] Date of Patent: May 22, 1990

[54] MANIPULATOR AND CONTROL METHOD

[75] Inventors: Hirohiko Arai; Susumu Tachi, both of Tsukuba, Japan

[73] Assignee: Agency of Industrial Science & Technology, Ministry of International Trade, Tokyo, Japan

[21] Appl. No.: 325,926

[22] Filed: Mar. 20, 1989

[30] Foreign Application Priority Data

Mar. 31, 1988 [JP] Japan ................................. 63-80079

[51] Int. Cl.$^5$ .............................................. B25J 1/02
[52] U.S. Cl. ................................ 318/568.16; 318/574;
318/575; 364/513; 901/9; 901/20; 188/72.4;
188/366
[58] Field of Search ............................... 318/564–571,
318/574, 573; 364/513; 901/3, 20, 22, 23, 28, 9,
16, 34; 414/733, 730, 744.3, 719, 753; 188/72.4,
170, 366

[56] References Cited

U.S. PATENT DOCUMENTS

| 4,068,156 | 1/1978 | Johnson et al. | 901/9 X |
| 4,308,584 | 12/1981 | Arai | 364/513 |
| 4,488,242 | 12/1984 | Tabata et al. | 364/513 |
| 4,528,632 | 7/1985 | Nio et al. | 901/20 X |
| 4,547,858 | 10/1985 | Horak | 901/9 X |
| 4,625,837 | 12/1986 | Zimmer | 188/366 X |
| 4,640,663 | 2/1987 | Niiomi et al. | 901/9 X |
| 4,693,665 | 9/1987 | Friederichs et al. | 188/72.4 X |
| 4,725,942 | 2/1988 | Osuka | 364/513 X |

Primary Examiner—William M. Shoop, Jr.
Assistant Examiner—Paul Ip
Attorney, Agent, or Firm—Oblon, Spivak, McClelland, Maier & Neustadt

[57] ABSTRACT

A multiple-degree-of-freedom manipulator having a plurality of joints is improved by providing some of said plurality of joints being provided with holding brakes, and providing any remaining joints with actuators which generate angular acceleration or linear acceleration in the joints provided with holding brakes while the holding brakes of the joints are released. A method of controlling the multiple-degree-of-freedom manipulators provided with one or more joints provided with holding brakes and one or more joints provided with actuators, comprises the steps of controlling the angular displacement or linear displacement of joints which have no actuators by the torque or force of joints which have actuators by means of the dynamic coupling between joints while the holding brakes are released, and controlling the angular displacement or linear displacement of joints which have actuators by means of the actuators while the brakes are engaged.

2 Claims, 8 Drawing Sheets

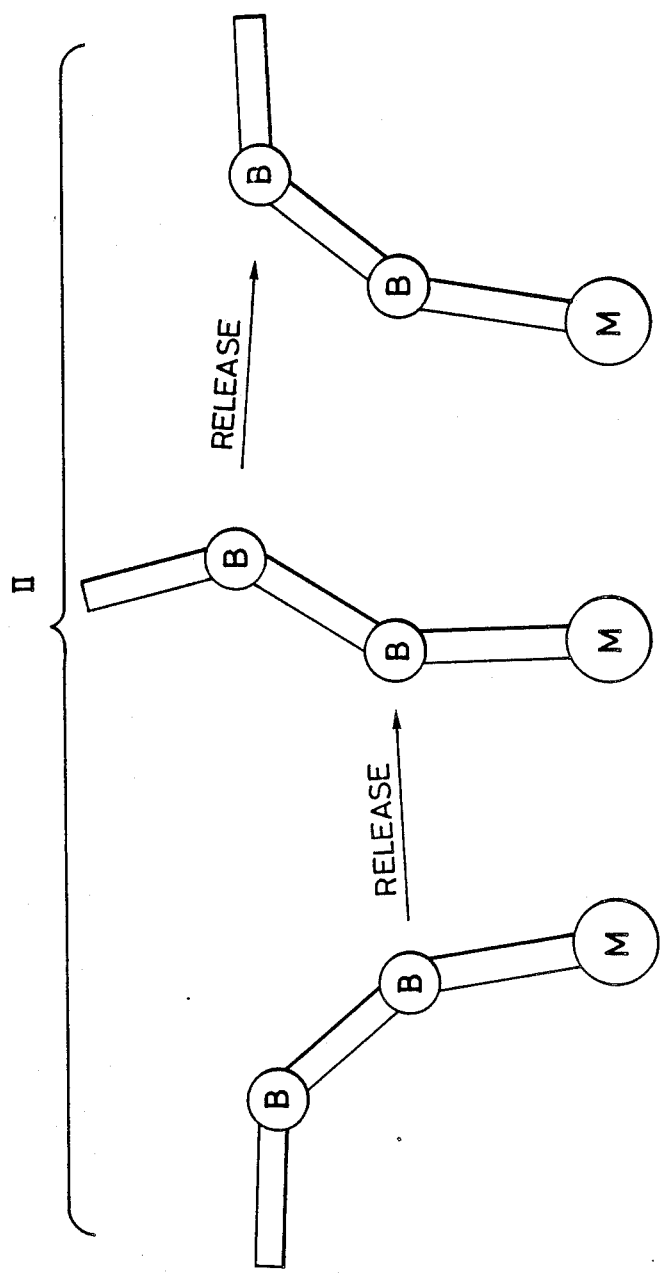

MANIPULATOR AND CONTROL METHOD

BACKGROUND OF THE INVENTION

1. Field of the Invention

This invention relates to manipulators with multiple degrees of freedom and t methods

2. Discussion of the Prior Art

Robot arms comprising links with multiple degrees of freedom have been developed to take the place of humans in the execution of manual work, while position control is carried out to realize operation with the same dexterity as a human.

The most basic hardware configuration of a manipulator is that in which each of the joints in the link mechanism comprises one actuator which drives the joint and a sensor which detects displacement of angle of the joint. Therefore, each joint of a manipulator normally has essentially independent positioning functions, so the number of degrees of freedom of the manipulator equals the number of actuators. While various techniques for controlling more degrees of freedom than the number of actuators have been proposed with the purpose of reducing the number of actuators, most of these are mechanism-dependent, such as methods in which differential mechanisms which follow objects are provided or methods in which mechanisms for transmission of power are provided.

Yet the conventional mechanism-dependent methods described above result in a more complex manipulator structure, with a concomitant high price, increasing the weight of the manipulator and requiring large amounts of driving energy.

SUMMARY OF THE INVENTION

This invention came about in light of the above, and its object is to provide a manipulator and control method to reduce the number of actuators in manipulator joints, allowing reduction of manufacturing cost, and the joints of which can be made to weigh less, and the actuators of which can be made more compact and conserve energy.

In keeping with this object, the manipulator of this invention is made up of a manipulator with n joints, in which k of these n joints are provided with actuators while the rest are provided with holding brakes.

The control method for this manipulator is as such: while the holding brakes of certain joints which have holding brakes are released, the torque or force of joints which have actuators generates, by means of dynamic coupling between joints, angular or linear acceleration in the joints whose brakes are released, thus controlling the angular or linear displacement of these joints whose brakes are released, and while the brakes of all joints which have holding brakes are applied, the angular or linear displacement of joints which have actuators can be controlled by these actuators, thus moving the tip of the manipulator from any point to any other point.

As described above, in manipulators with links connected by joints, the dynamic coupling between joints can be used to generate angular or linear acceleration in joints which have no actuators and thus control angular or linear displacement, so that not all joints require actuators, thus reducing the number of actuators and allowing the design of more compact and energy-efficient manipulators while also reducing manufacturing costs.

The above and other features and objects of the present invention will become apparent with the following detailed description made with reference to the drawings.

BRIEF DESCRIPTION OF THE DRAWINGS

FIG. 8 is an explanatory diagram illustrating the on/off switching state of the brakes of passive joints.

DESCRIPTION OF THE PREFERRED EMBODIMENTS

The non-linearity and coupling characteristics normally present in the dynamic system of a manipulator act as a disturbance with respect to servomechanisms provided one on each joint. Compensating for this disturbance torque is a major problem in manipulator control. Yet through the motion of other joints, the generation of just such a disturbance torque can also cause motion in joints which do not have the ability to generate torque themselves.

This invention is a method of using this type of dynamic coupling to control manipulators with passive joints having no actuator.

First, the theory will be explained.

Figure 1:
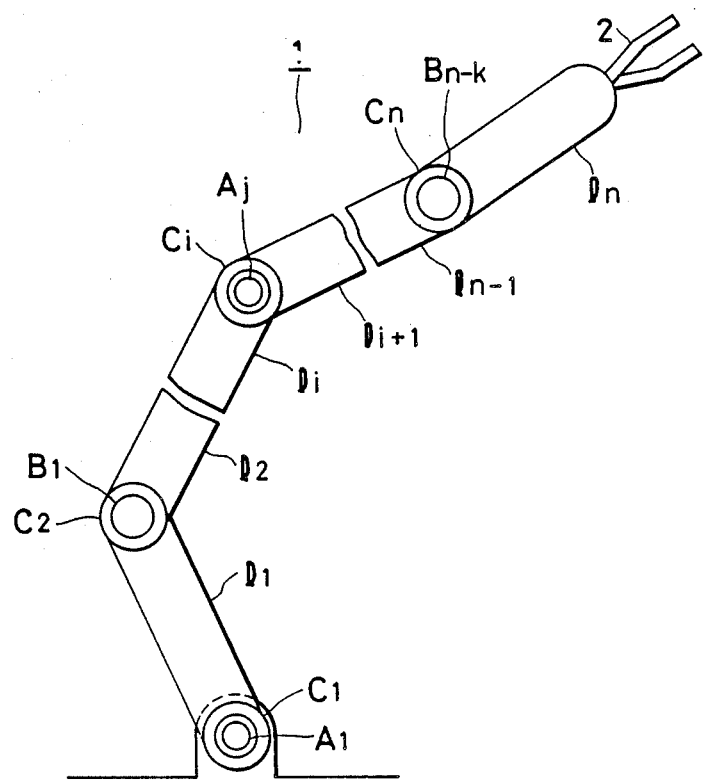
FIG. 1 is a schematic diagram of the manipulator of this invention.

In FIG. 1, 1 is a manipulator. Manipulator 1 effects n degrees of freedom by a plurality of links 1 $\{l_1, l_2 ... l_n\}$ linked by joints C $\{C_1, C_2 ... C_n\}$. The leading link $l_n$ forms a hand 2. Of the plurality of joints C $\{C_1 ... C_n\}$, any number k of joints C $\{C_1 ... C_i ...\}$ are provided with actuators A $\{A_1 ... A_j ... A_k\}$ and the remaining number $(n-k)$ of joints C $\{C_2 ... C_n\}$ are provided with holding brakes B $\{B_1 ... B_{n-k}\}$.

The actuators A are able to drive their neighboring links and control their relative angle, relative angular velocity and relative angular acceleration.

The holding brakes B are able to control and release the motion of their neighboring links.

Figure 2:
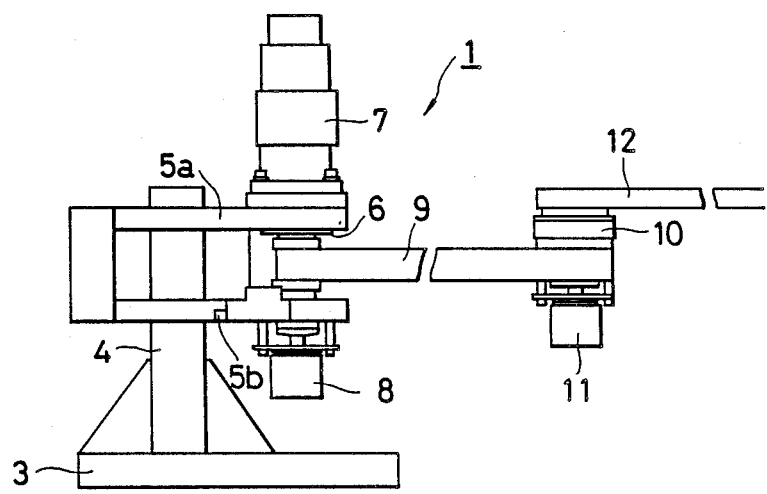
FIG. 2 is a side view illustrating a preferred embodiment of the manipulator of this invention.

FIG. 2 illustrates an example of one joint provided with an actuator and one joint provided with a holding brake. Base 3 is provided with a strut 4, a pair of support arms 5a and 5b are fixed a distance apart on the top and bottom of strut 4, while an axle 6 is supported by the ends of the support arms 5a and 5b in such a way that it is able to rotate. The portion of axle 6 protruding from the upper surface of the support arm is connected to the rotating axle of actuator 7 provided on support arm 5a, comprising an active joint. The portion of axle 6 protruding from the lower surface of the support arm 5b extends into sensor 8 which measures the angle of rotation of axle 6.

The portion of axle 6 between support arms 5a and 5b is fixed to one end of link 9.

On the free end of arm 9, via a brake 10 which is applied or released by commands from a controller (not shown), a link 12 is supported in such a way that it is able to rotate, comprising a passive joint in which the turning angle of link 12 is measured by a sensor 11 provided on the lower surface of arm 9.

In a manipulator of the above structure, while the brake 10 is applied, driving actuator 7 causes link 9 to rotate with the rotation of actuator 7, and link 12 will also move.

While the brake 10 is released, driving actuator 7 again causes link 9 to rotate with the rotation of actuator 7, but in this case, link 12 will rotate in an infinite variety of modes depending on the actuator 7 rotating speed, length of time driven, deceleration conditions and such. The control of this is explained next.

Note that while in the preferred embodiment shown, the active joint and passive joint are connected by link 9, they can also be connected by a plurality of passive joints.

Control of a manipulator of n degrees of freedom will be explained. Of the n degrees of freedom, the joints of k degrees of freedom are, as in normal manipulators, active joints comprising an actuator A and a displacement sensor, while the other n−k degrees of freedom are passive joints having no actuator, comprising only a holding brake B and a displacement sensor ($0<k<n$). The passive joints are able to move freely while the holding brake is off. But while the holding brake is on, the passive joint is fixed in that position.

While the holding brake of a passive joint is off, that passive joint can be indirectly controlled by the coupling torque (force) generated with the motion of the active joints. Applying a holding brake can also control the displacement of other joints without affecting that passive joint. In addition, if the holding brakes of all passive joints are applied and set, the active joints can be controlled as in a normal manipulator. By combining these control modes, the position and posture of the entire manipulator can be controlled by successively switching the joints which carry out control.

The equation of motion of the manipulator is expressed by $$M(q)\ddot{s} + b(q,\dot{q}) = u. \tag{1}$$

Provided that $$b(q,\dot{s}) = h(q,\dot{q}) + \Gamma\dot{q} + g(q)$$

where $q \in R^n$ is a joint displacement vector, $u \in R^n$ is a joint driving force vector, $g(q) \in R^n$ is a gravity term, $h(q,\dot{q}) \in R^n$ is a Coriolis and centrifugal force term, $M(q) \in R^{n \times n}$ is an inertia matrix, and $\Gamma \in R^{n \times n}$ is a viscous friction matrix.

Here, of the elements of matrix q, the displacement of any k joints are selected and introduced as $\psi \in R^k$. Of these, the number of passive joints is assumed to be m ($0 \leq m \leq k$). Thus of the k active joints, the number of joints not included is also m, and their displacement is introduced as $\phi \in R^m$. The remaining n−k−m joints not included in $\psi$ or $\phi$ are all passive joints, and their displacement is introduced as $\theta \in R^{n-k-m}$. Also, the driving force of the k active joints is introduced as $\tau \in R^k$. The brakes of passive joints belonging to $\psi$ are set to an off position, and the brakes of passive joints belonging to $\theta$ are set to an on position. The braking force of those passive joints with brakes off is assumed to be zero. The braking force of those passive joints with brakes on is $\nu$. By rearranging the the elements of q and u, the equations $$q = \begin{bmatrix} \phi \\ \psi \\ \theta \end{bmatrix} \begin{matrix} m \\ k \\ n-k-m \end{matrix} \quad u = \begin{bmatrix} \tau \\ 0 \\ \nu \end{bmatrix} \begin{matrix} k \\ m \\ n-k-m \end{matrix} \tag{2}$$

result. Since the passive joints belonging to $\theta$ are fixed, $\ddot{\theta} = 0$. Rearranging $M(q)$ and $b(q,\dot{q})$ correspondingly, they are divided as follows.

$$M(q) = \begin{bmatrix} M_{11}(q) & M_{21}(q) & M_{31}(q) \\ M_{21}(q) & M_{22}(q) & M_{32}(q) \\ M_{31}(q) & M_{32}(q) & M_{33}(q) \end{bmatrix} \begin{matrix} k \\ m \\ n-k-m \end{matrix}$$
$$\quad\quad\quad m \quad\quad k \quad\quad n-k-m$$

$$b(q,\dot{q}) = \begin{bmatrix} b_1(\dot{q},q) \\ b_2(\dot{q},q) \\ b_3(\dot{q},q) \end{bmatrix} \begin{matrix} k \\ m \\ n-k-m \end{matrix}$$

Substituting equations (2) and (3) into (1), $$M_{11}\ddot{\phi} + M_{12}\ddot{\psi} + b_1(q,\dot{q}) - \tau = 0 \tag{4a}$$

$$M_{21}\ddot{\phi} + M_{22}\ddot{\psi} + b_2(q,\dot{q}) = 0 \tag{4b}$$

$$M_{31}\ddot{\phi} + M_{32}\ddot{\psi} + b_3(q,\dot{q}) - \nu = 0 \tag{4c}$$

Substituting the current values of the joint displacement and velocity measured for each joint and into the $q,\dot{q}$ of equations (4a) and (4b), $b_1(q,\dot{q})$, $b_2(q,\dot{q})$ and $M_{11}$, $M_{12}$, $M_{21}$, and $M_{22}$ can be found. Furthermore, by giving the acceleration $\ddot{\psi}$ a desired value ($=\ddot{\psi}_d$), equation (4b) can be considered to be a system of linear equations with respect to $\ddot{\phi}$. The coefficient matrix $M_{21}$ represents the dynamic coupling between $\phi$ and $\psi$, and is dependent on the manipulator structure and mass distribution. If $M_{21}$ is regular, equation (4b) has a unique solution, $$\ddot{\phi} = -M_{21}^{-1} M_{22} \ddot{\psi}_d - M_{21}^{-1} b_2(q,\dot{q}) \tag{5}$$

and substituting equation (5) into (4a), $$\tau = (M_{12} - M_{11}M_{21}^{-1}M_{22})\ddot{\psi}_d - b_1(q,\dot{q}) - M_{11}M_{21}^{-1} b_2(q,q) \tag{6}$$

If the driving force $\tau$ thus found is generated in the active joint, the acceleration $\ddot{\phi}$ and $\ddot{\psi}_d$ will be obtained. That is to say, by means of the driving force of k active joints, the acceleration of any k joints including m passive joints can be set to any value. The acceleration $\ddot{\phi}$ of m active joints is determined by $\ddot{\psi}_d$, so it cannot be given any arbitrary value. Also, the velocity $\dot{\theta}$ and acceleration $\ddot{\theta}$ of the n−k−m passive joints are 0. Yet if the assignment of the k joints which control acceleration is sequentially switched by the on/off switching of brakes, ultimately the displacement of all joints can be controlled. (The state of the holding brakes of all passive joints being turned on, completely immobilizing the passive joints, is equivalent to m=0, in which the active joints are in control as in a normal manipulator.)

When controlling the position and posture of a manipulator, depending on the combination of control modes using brake on/off switching, an infinite number of control algorithms are conceivable. First, as one example of these, consider the case of point-to-point (PTP) control between any two points in which $m = n - k$ ($\leq k$). In this case, the brakes of all passive joints are turned to an on or off position simultaneously.

While the brakes are in an off position, passive joints are controlled, and while the brakes are in an on position the active joints are controlled, so at least one mode switch is required to bring all joints of the manipulator to the desired position. On the other hand, precise simultaneous movement of both passive joints and active joints to the desired position is considered to be difficult while the brakes are in an off position. To resolve this problem, a more advantageous order for the control to be carried out would be to first position the passive joints with the brakes in an off position and then position the rest of the active joints with the brakes in an on position.

While PTP control is possible with only this, in order to further simplify control, first add a "brake on" period in which initial acceleration is accomplished by the active joints. Kinetic energy is thus provided to the link mechanism, facilitating movement of passive joints during the "brake off" period and suppressing unnecessary movement of the active joints.

Figure 3:
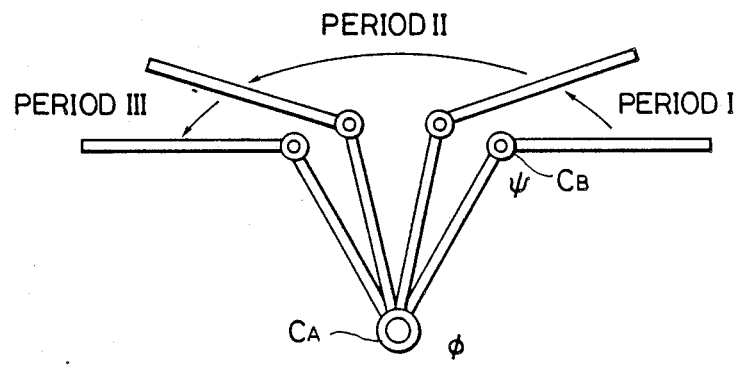
FIG. 3 is an explanatory diagram illustrating the control state of the manipulator of this invention.
Figure 4:
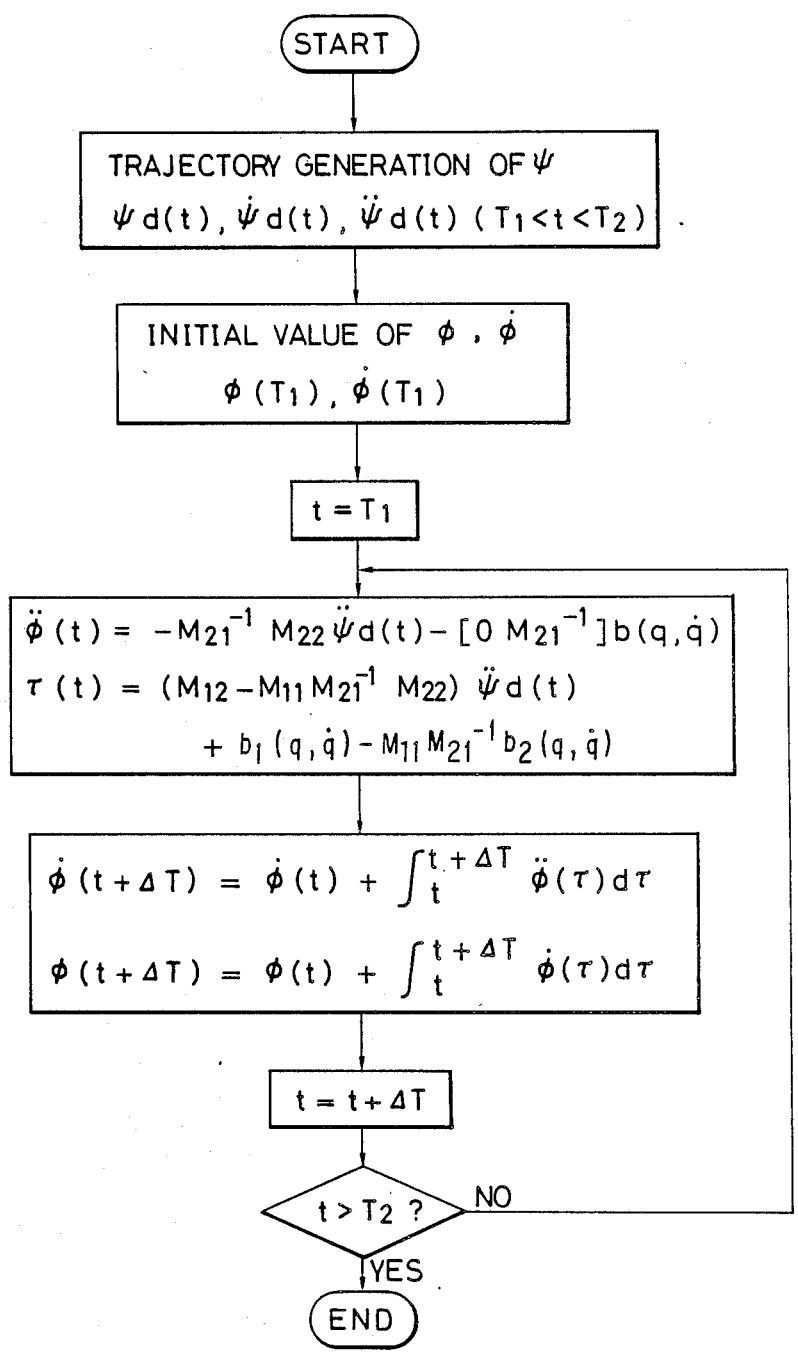
FIG. 4 is a flowchart illustrating the determination of the trajectory in period II and the actuator driving force.

Therefore, control can be carried out by dividing the trajectory between two points into the following three periods, as shown in FIG. 3. Note that FIG. 3 shows a manipulator in which $n = 2$, $k = 1$ and $m = 1$, and $C_A$ and $C_B$ designate an active joint with actuator and a passive joint with brake, respectively.

I. $\psi$-axis holding period ($T_0 \leq t \leq T_1$, brake in an on position)
II. $\psi$-axis release period ($T_1 \leq t \leq T_2$, brake in an off position)
III. $\psi$-axis holding period ($T_2 \leq t \leq T_3$, brake in an on position)

In period II, k joints including passive joints are moved along the desired trajectory, while in periods I and III the remaining m active joints are moved from the initial position to the final position. First, the trajectory and driving force of the actuator in period II are determined off-line as follows.

① Each of the k joints including all passive joints are given displacement, velocity, and acceleration desired value $\psi_d(t)$, $\dot{\psi}_d(t)$ and $\ddot{\psi}_d(t)$ ($T_1 \leq t \leq T_2$). Note that since the passive joints must be stationary for the instant that the brakes are switched between an on and off position, $\dot{\psi}_d(T_1) = \dot{\psi}_d(T_2) = 0$ is a boundary condition.)
② The remaining m joints are given initial values of $\phi(T_1)$ and $\dot{\phi}(T_1)$.
③ Calculation of equations (5) and (6) is carried out to find $\tau(T_1)$ and $\ddot{\phi}(T_1)$.
④ Numerical integration of $\ddot{\phi}(t)$ is carried out to find $\dot{\phi}(T_1 + \Delta T)$ and $\phi(T_1 + \Delta T)$. Here, $\Delta T$ is the sampling interval.
⑤ Steps ({③ calculation of equations (5) and (6) →④ numerical integration} are iterated to determine the driving force $\tau$, acceleration $\ddot{q}$, velocity $\dot{q}$ and displacement $q$ over period II.

Also, the results of the off-line calculations are used to determine the boundary values $\dot{\phi}$ and $\phi$ between period II and period I and between period II and period III.

$$\ddot{\psi}d_d' = \ddot{\psi}_d + K_v(\dot{\psi}_d - \dot{\psi}) + K_p(\psi_d - \psi) \quad (7)$$

($K_v$ and $K_p$ are diagonal gain matrices).

Here $\psi_d$, $\dot{\psi}_d$ and $\ddot{\psi}_d$ are the displacement, velocity and acceleration desired value given in step ①, while $\psi$ and $\dot{\psi}$ are the measured values of displacement and velocity. The acceleration $\ddot{\psi}_d'$ found in equation (7) is substituted into the $\ddot{\psi}_d$ of equation (6) to find driving force $\tau$. In this case, the measured values of both $\psi$ and $\dot{\psi}$ can be used without using numerical integration (FIG. 5).

Figure 5A:
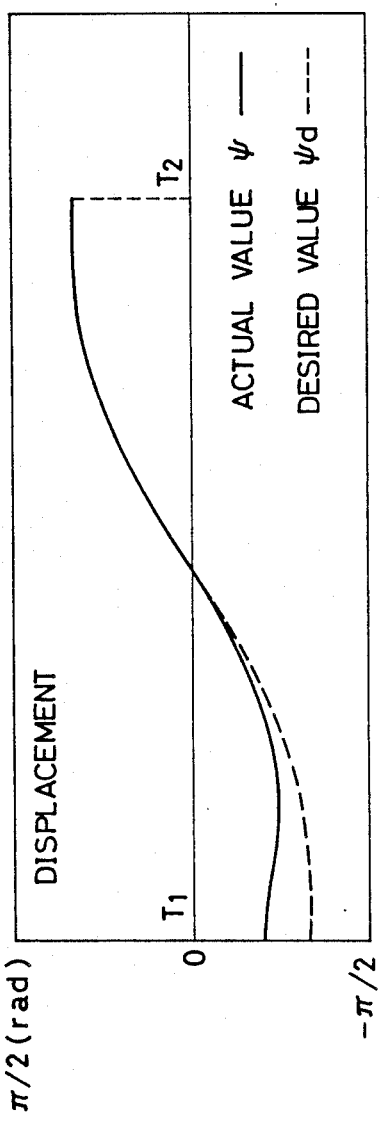
FIGS. 5A–5C are the results of a simulation illustrating the convergence when applying feedback control to the manipulator of this invention.
Figure 5B:
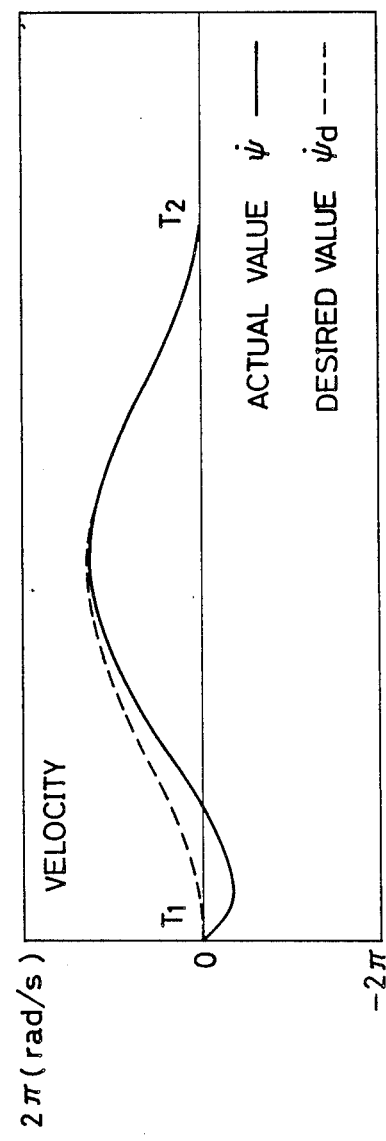
Figure 5C:
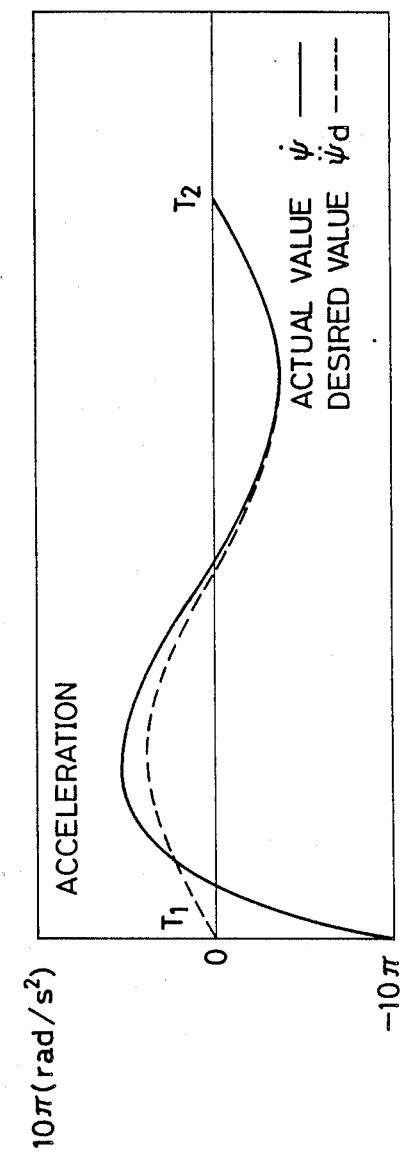

Specifically, FIG. 5 shows the results of a simulation representing convergence when the above feedback control is applied to a two-degree-of-freedom manipulator. When positioning the passive joint so that $\psi$ goes from $-\tau/2$ to $\tau/2$, assuming that there is an error of 20% ($\tau/5$), the actual values (solid lines) of angular displacement $\dot{\psi}$ (FIG. 5(b)) and angular acceleration $\ddot{\psi}$ (FIG. (c)) can be seen to converge to the desired value (broken lines).

Control of $\phi$ in periods I and III are as in a normal manipulator. In period I, control is carried out from $\phi(T_0)$ as the initial position with $\dot{\phi}(T_0) = 0$, assuming that $\phi(T_1)$ and $\dot{\phi}(T_1)$ given in step ② are the desired value. In period III, control is carried out from $\phi(T_2)$ and $\dot{\phi}(T_2)$, assuming that $\phi(T_3)$ as the final position and $\dot{\phi}(T_3) = 0$ is the desired value (FIG. 6, FIG. 7).

Figure 6B:
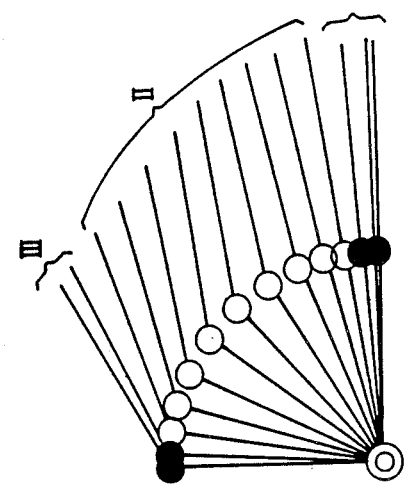
FIGS. 6A and 6B are explanatory diagrams illustrating the control of the actuator and the state of the arm in periods I and III.
Figure 6A:
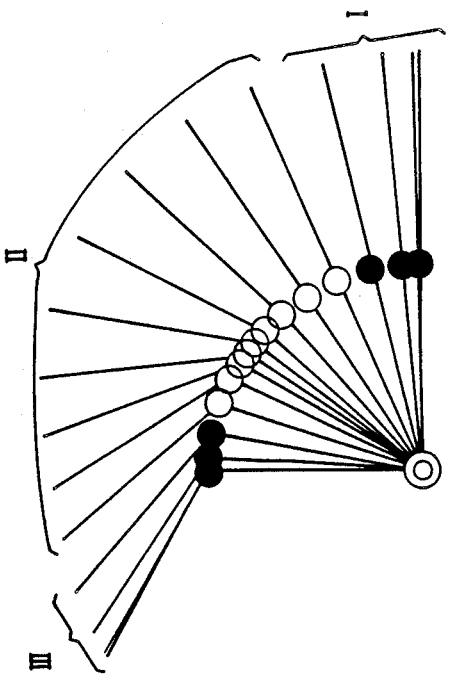

Specifically, in FIG. 6, a white circle indicates that the brake is released, while a black circle indicates that the brake is applied. FIG. 6(a) illustrates the situation when the rotating actuator is quickly accelerated and then the brake is activated. FIG. 6(b) illustrates the situation when the actuator is quickly accelerated and then the brake is activated.

Figure 7:
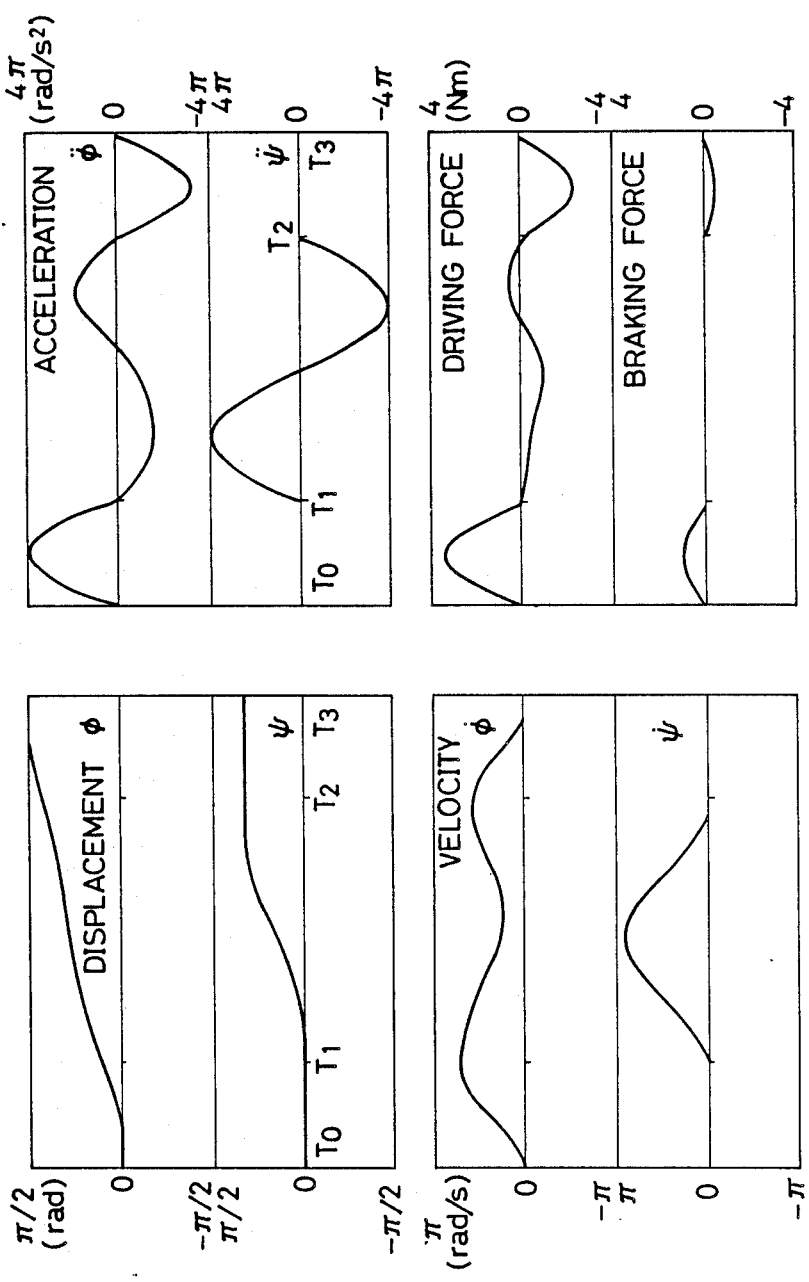
FIG. 7 is a simulation illustrating an example of positioning control when a control algorithm is applied to the manipulator of this invention

FIG. 7 shows the results of a simulation which illustrates position control when the above algorithm is similarly applied to a two-degree-of-freedom manipulator. The variations in active joint angular displacement $\phi$, angular velocity $\dot{\phi}$, angular acceleration $\ddot{\phi}$, passive joint angular displacement $\psi$, angular velocity $\dot{\psi}$ and angular acceleration $\ddot{\psi}$, along with the actuator driving force $\tau_\phi$ and the braking force $\tau_{104}$ are represented. The brake is in an on position over the regions $T_0$–$T_1$ and $T_2$–$T_3$, and off over $T_1$–$T_2$. Sinusoidal acceleration occurs in $\psi$ over $T_1$–$T_2$ and in $\phi$ over $T_0$–$T_1$ and $T_2$–$T_3$, and $T_1$–$T_0$, $T_2$–$T_1$, and $T_3$–$T_2$ are determined in such a way that the maximum angular acceleration for each is no greater than $4\pi$ rad/s$^2$.

By means of the above algorithm, the joint displacement q of the manipulator can be moved between any two points. In the case that $n - k > k$, as shown in FIG. 8, the passive joints to be controlled in period II can be positioned k joints at a time by the successive on/off position switching of brakes.

With this invention, in a manipulator with links connected by joints, the dynamic coupling between joints can be used to generate angular acceleration in joints which have no actuators and thus control angular displacement, so that joints having no actuator can be driven without requiring a transmission mechanism, thus reducing the number of actuators. Therefore, the manipulator structure is simplified and can be made more compact and energy-efficient.

What is claimed is:

1. A multiple-degree-of-freedom manipulator comprising:
   a plurality of links;
   at least one passive joint for joining adjacent links and which is provided with a first sensor for detecting relative angles or relative displacements of said links and a brake which is brought to an operating state wherein said passive joint is completely fixed immovably and a release state wherein said passive joint is freely movable;
   at least one active joint for adjacent links and provided with an actuator for actuating said active joint and a second sensor for detecting relative angles or relative displacements of said links; and control means for driving said actuator and switching said brake between said operating state and said release state on the basis of relative angles or relative displacements of said links detected by said first and second sensors.

2. A method for controlling a multiple-degree-of-freedom manipulator having a plurality of links joined together with at least one passive joint provided with a brake and a first sensor and at least one active joint provided with an actuator and a second sensor, comprising the steps of:

detecting relative angles or relative displacements of said links with said first and second sensors;

giving a desired value to said active joint when said brake is in an operating state wherein said passive joint is completely fixed immovably and, on the basis of the difference between said desired value and a signal detected by said second sensor, driving said actuator to accelerate or decelerate said active joint;

giving a desired value to said passive joint when said brake is in a release state wherein said passive joint is freely movable and, on the basis of the difference between said desired value and a signal detected by said first sensor and signals detected by said first and second sensors, driving said actuator to accelerate or decelerate said passive joint; and controlling said passive joint to be brought to said operating and release states and, at the same time, driving said actuator, thereby accelerating or decelerating said passive or active joint to position said manipulator at a position corresponding to a desired value.

* * * * *